United States Patent [19]
Kamiya

[11] Patent Number: 5,698,636
[45] Date of Patent: Dec. 16, 1997

[54] OCULAR LENS MATERIAL AND PROCESS FOR PRODUCING THE SAME

[75] Inventor: Hideaki Kamiya, Nagoya, Japan

[73] Assignee: Tomey Technology Corporation, Nagoya, Japan

[21] Appl. No.: 776,642
[22] PCT Filed: Jun. 5, 1996
[86] PCT No.: PCT/JP96/01528
§ 371 Date: Feb. 5, 1997
§ 102(e) Date: Feb. 5, 1997
[87] PCT Pub. No.: WO96/39645
PCT Pub. Date: Dec. 12, 1996

[30] Foreign Application Priority Data

Jun. 6, 1995 [JP] Japan ................................ 7-139482

[51] Int. Cl.$^6$ ............................................. C08F 267/10
[52] U.S. Cl. .................................. 525/282; 525/296
[58] Field of Search ...................... 526/262; 525/282, 525/296

[56] References Cited

FOREIGN PATENT DOCUMENTS 3244608  10/1991  Japan .
6-281892 10/1994  Japan .

*Primary Examiner*—Joseph L. Schofer
*Assistant Examiner*—Wu C. Cheng
*Attorney, Agent, or Firm*—Varndell Legal Group

[57] ABSTRACT

An ocular lens material containing a polymer having a maleimide derivative-α-methylstyrene unit and N,N-dimethylacrylamide unit, which is excellent in optical property, has a high water-absorptive property and a high mechanical strength and further only shows an extremely small size change based on pH change of a solution under the hydrated state, and which can be preferably used for, in particular, water-absorptive contact lenses and the like, and a process for producing the same.

12 Claims, No Drawings

OCULAR LENS MATERIAL AND PROCESS FOR PRODUCING THE SAME

TECHNICAL FIELD

The present invention relates to an ocular lens material and a process for producing the same, and more particularly to an ocular lens material which can be preferably used for ocular lenses such as high water-absorptive contact lenses, and a process for producing the same.

BACKGROUND ART

In the nineteen-nineties, in a field of toiletries such as menstrual goods and paper napkin, a field of medical articles such as artificial skin, artificial muscle and water-absorptive contact lenses, and a field of articles for foods, such as wrapping materials for keeping freshness of foods, a high water-absorptive polymer is more widely developed as a new functional material. Particularly, in the field of medical articles, a contact lens material composed of high water-absorptive hydrogel is preferably used from the viewpoint of good sensation of wearing, easiness of adaptation to eyes (good adaptation to organisms) and the like.

However, the thus contact lens material composed of hydrogel which is insoluble in water and shows high water-absorptive property has a problem that mechanical property is suddenly lowered in accordance with the increase of water content. Also, on the contrary, the contact lens material has a problem that gas permeability is lowered in accordance with the lowering of water content. Accordingly, it is desired that hydrogel which is sufficiently satisfied with gas permeability and mechanical property at the same time is developed.

In the thus situation, there is developed a polymer obtained by using N,N-dimethylacrylamide, such as a (meth)acrylic acid alkyl ester-N,N-dimethylacylamide copolymer.

The above-mentioned polymer shows good transparency and water soluble. However, in the polymer, water-absorptive property which should be originally heightened by N,N-dimethylacrylamide and mechanical strength which should be originally heightened by a (meth)acrylic acid alkyl ester are counterbalanced with each other. Accordingly, the polymer has a problem that water-absorptive property and mechanical strength are not sufficient.

In order to solve the above-mentioned problem, there are proposed, for instance, (1) a method comprising previously preparing a polymer having a polymerizable group by using a (meth)acrylic acid alkyl ester, and then, copolymerizing the polymer with N,N-dimethylacrylamide (Japanese Examined Patent Publication No. 29091/1993), (2) a method comprising carrying out the polymerization with containing a component for introducing a specific reactive group into a molecule of the obtained polymer, and copolymerizing a copolymer obtained by reacting a monomer having reactivity with the reactive group in the obtained polymer with the above-mentioned polymer, with N,N-dimethylacrylamide (Japanese Examined Patent Publication No. 81612/1992), (3) a producing method of a soft contact lens having a structure formed by immersing the prepared polymers in a molecular chain network and intertwining with each other (Inter Penetrate Network), comprising polymerizing a hydrophilic monomer with a hydrophobic monomer by using a crosslinking agent which easily crosslinks with these monomers (Japanese Examined Patent Publication No. 23271/1984), and the like.

However, in the above-mentioned methods (1) and (2), there are problems that it is difficult to prepare the polymer having a polymerizable group and that its process is complicated.

In the above-mentioned producing method (3), in order to sufficiently exhibit properties which should be originally exhibited by a hydrophilic and a monomer hydrophobic monomer, a hydrophilic monomer and a hydrophobic monomer which respectively have different polymerizable groups are used so that each of monomers separately polymerizes. For instance, a monomer having vinyl group, such as N-vinyl pyrrolidone is used as a hydrophilic monomer, and a hydrophobic monomer such as methyl methacrylate is used as a hydrophobic monomer. However, in the method, there are problems that the above-mentioned monomer having vinyl group easily remains without polymerizing and that non-crosslinked N-vinyl pyrrolidone polymer easily elutes because the vinyl group shows, as usual, low polymerizability.

For instance, as a method for producing an ocular lens such as a contact lens from an ocular lens material, (A) cutting and polishing method, (B) molding method, (C) spin-casting method and the like are known.

The above-mentioned method (A) is a method comprising, as usual, cutting the obtained polymer in a state of rod or plate by using a lathe and the like, and then, polishing the surface, and is a method which is suitable for exactly processing to various designed materials. However, in the above-mentioned method (A), there is a problem that the method is not suitable for producing ocular lenses on a large scale because raw materials in a large amount are wasted as cutting dust, there are many producing processes and producing time becomes long.

In both the above-mentioned metheods (B) and (C), contrary to the above-mentioned method (A), raw materials in a large amount are not wasted because a molded article is obtained during the polymerization in a mold. However, in the above-mentioned method (B), there is a problem that the cost becomes high because polymerization time is long and many molds are necessitated for maintaining the shape till the polymerization is finished. Also, although an ocular lens having smooth surface can be obtained by the above-mentioned method (C), in the method (C), there is a problem that adjustment of time for adding monomers and control of polymerization condition and the like are complicated, so that the method is not suitable for producing ocular lenses on a large scale.

Also, from the viewpoint of the production of plastic lenses on a large scale, as usual, (D) press working method, (E) injection molding method and the like are employed. However, in these methods, it is necessary that a non-crosslinked polymer is used. Therefore, when these methods are applied to the production of a contact lens, elution which is the greatest defect resulting from a non-crosslinked polymer is generated and cloudiness in white is generated during the hydration, so that these methods have a problem that these are not suitable for producing an ocular lens material and the like.

The present invention has been accomplished in consideration of the above-mentioned prior art, and aims at providing an ocular lens material which has an excellent optical property, a high water-absorptive property and a high mechanical strength, and further only shows an extremely small size change based on pH change of a solution under the hydrated state and the like, and a process for producing the same.

DISCLOSURE OF THE INVENTION

The present invention relates to

① an ocular lens material containing a polymer having a maleimide derivative-α-methylstyrene unit represented by the formula (I):

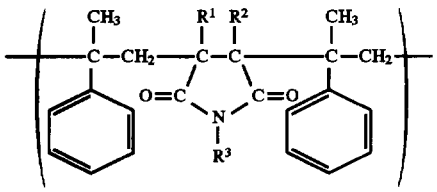

wherein each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms, and N,N-dimethylacrylamide unit represented by the formula (II):

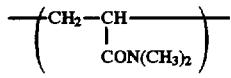

, and

② a process for producing the above-mentioned ocular lens material characterized by carrying out the polymerization with dissolving a maleimide derivative-α-methylstyrene copolymer obtained by polymerizing a copolymerizable component containing a maleimide derivative represented by the formula (IV):

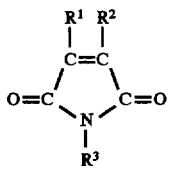

wherein each of $R^1$ and $R^2$ is independently hydrogen atom or an alkyl group having 1 to 2 carbon atoms, and $R^3$ is hydrogen atom, an alkyl gorup having 1 to 12 carbon atoms or an aryl group which may be substituted, having 6 to 12 carbon atoms and α-methylstyrene, in N,N-dimethylacrylamide, and then, heating the obtained polymer composition to 130° to 250° C.

BEST MODE FOR CARRYING OUT THE INVENTION

According to the present invention, an ocular lens material containing a polymer having a maleimide derivative-α-methylstyrene unit represented by the formula (I):

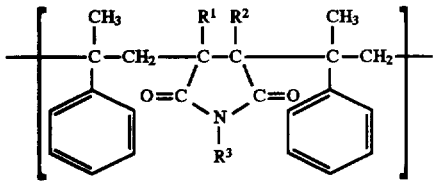

wherein each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms, and N,N-dimethylacrylamide unit represented by the formula (II):

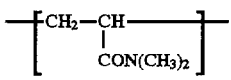

is produced by carrying out the polymerization with dissolving a maleimide derivative-α-methylstyrene copolymer obtained by polymerizing a copolymerizable component containing a maleimide derivative represented by the formula (IV):

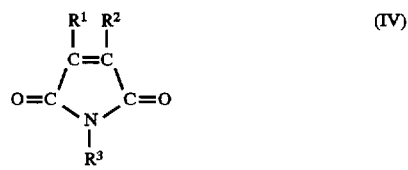

wherein each of $R^1$ and $R^2$ is independently hydrogen atom or an alkyl group having 1 to 2 carbon atoms, and $R^3$ is hydrogen atom, an alkyl gorup having 1 to 12 carbon atoms or an aryl group which may be substituted, having 6 to 12 carbon atoms and α-methylstyrene, in N,N-dimethylacrylamide, and then, heating the obtained polymer composition to 130° to 250° C.

Because the ocular lens material of the present invention is obtained by using N,N-dimethylacrylamide, the ocular lens material has high water content. Also, because the ocular lens material of the present invention has not only the N,N-dimethylacrylamide unit represented by the formula (II) but also the maleimide derivative-α-methylstyrene unit represented by the formula (I), the ocular lens material is highly reinforced with the maleimide derivative-α-methylstyrene unit.

Usually, a non-crosslinked homopolymer composed of N,N-dimethylacrylamide is gradually dissolved in water, so that the homopolymer cannot be water-insoluble hydrogel.

The above-mentioned polymer which composes the ocular lens material of the present invention is not often crosslinked before heating as the same as the above-mentioned non-crosslinked homopolymer composed of N,N-dimethylacrylamide. Nevertheless, the ocular lens material obtained by heating the above-mentioned polymer is insoluble in water and becomes gel even if it is hydrated and even if it is boiled in water.

As aforementioned, it is considered that the fact that the ocular lens material containing the above-mentioned polymer is insoluble in water is probably based on the fact that the following reaction proceeds.

That is, firstly, when the polymerization is carried out after the maleimide derivative-α-methylstyrene copolymer obtained by polymerizing the copolymerizable component containing the maleimide derivative and α-methylstyrene is dissolved in N,N-dimethylacrylamide, it is considered that part of radicals generated during the radical polymerization of the N,N-dimethylacrylamide transfer to the above-mentioned maleimide derivative-α-methylstyrene copolymer, and crosslinking points are generated in the copolymer. However, it is considered that the amount of the crosslinking point is extremely small. Accordingly, when the polymerization is carried out, it is considered that there is generated a polymer composition in which the maleimide derivative-α-methylstyrene copolymer and a homopolymer of N,N-dimethylacrylamide exist at the same time.

Next, the above-mentioned polymer composition is heated to 130° to 250° C. When the above-mentioned polymer composition is heated, it is considered that continuous parts of the α-methylstyrene unit in the molecular chain of the maleimide-derivative-α-methylstyrene copolymer are thermally decomposited, radicals are generated, and the parts where the radicals are generated bond to the above-mentioned homopolymer of N,N-dimethylacrylamide by radical chain transfer, so that there is formed a structure comprising a bond of these α-methylstyrene units to the homopolymer of N,N-dimethylacylamide.

Because the ocular lens material of the present invention has, as aforementioned, the structure comprising a bond of two α-methylstyrene units to the homopolymer of N,N-dimethylacrylamide, the above-mentioned homopolymer of N,N-dimethylacrylamide is crosslinked with the maleimide α-methylstyrene has property not generating the polymer at higher temperature than this temperature. Also, it has been recognized that the Tc becomes lower in acocrdance with the lowering of the concentration of α-methylstyrene (monomer) in the polymerization reaction system.

Accordingly, although α-methylstyrene has homopolymerizability, it is actually difficult to prepare a homopolymer of α-methylstyrene.

Then, for instance, when N-phenylmaleimide which is one of examples of the maleimide derivative is copolymerized with α-methylstyrene, as shown by the formula:

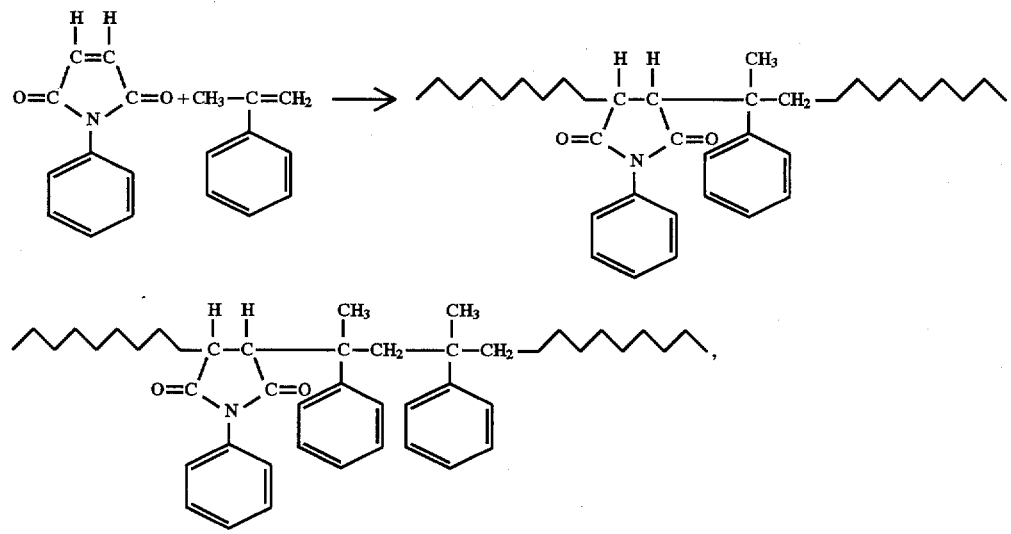

derivative-α-methylstyrene units. Accordingly, it is considered that the ocular lens material is insoluble in water even if it is hydrated or even if it is boiled by immersing in water.

The maleimide derivative-α-methylstyrene unit in the above-mentioned polymer which composes the ocular lens material of the present invention is obtained by copolymerizing the maleimide derivative with α-methylstyrene.

an alternating copolymer of N-phenylmaleimide with α-methylstyrene is generated and continuous parts of α-methylstyrene exist in part of the molecular chain.

When the continuous parts of α-methylstyrene are heated to 130° to 250° C., a bond of these α-methylstyrene to each other is cut, so that in the above-mentioned copolymer, as shown by the formula:

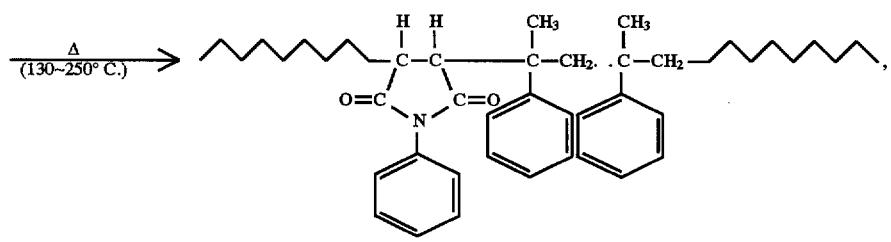

α-Methylstyrene is a monomer having homopolymerizability and low ceiling temperatuer (hereinafter referred to as Tc). When a polymer is prepared by polymerizing monomers, the obtained polymer is depolymerized at high temperature. The above-mentioned Tc is the temperature at the time when the velocity of the generation of the polymer becomes equal to the velocity of the depolymerization of the polymer. The Tc of α-methylstyrene is 63° C. and a radical is generated. This resultant radical transfers to a N,N-dimethylacrylamide polymer, and the cut N-phenylmaleimide-α-methylstyrene copolymer bonds to the N,N-dimethylacrylamide polymer to generate the above-mentioned polymer.

As a result, the above-mentioned polymer has a high mechanical strength based on the N-phenylmaleimide-α-methylstyrene unit and a high water-absorptive property based on the N,N-dimethylacrylamide unit, and the polymer is uniform without macroscopic phase separation and does not lose its transparency when it is hydrated.

The maleimide derivative used in the present invention is a compound represented by the formula (IV):

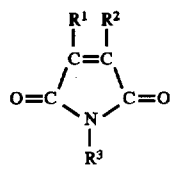

wherein each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms. Moreover, in the formula (IV), examples of a substituent of an aryl group which may be substituted, showing $R^3$ are, for instance, hydroxyl group, an alkoxyl group and the like.

Typical examples of the above-mentioned maleimide derivative are, for instance, a N-alkylmaleimide such as N-methylmaleimide or N-butylmaleimide; N-phenylmaleimide; a N-alkylphenylmaleimide such as N-o-methylphenylmaleimide, N-m-methylphenylmaleimide or N-p-methylphenylmaleimide; a N-hydroxyphenylmaleimide such as N-o-hydroxyphenylmaleimide; a N-alkoxyphenylmaleimide such as N-m-methoxyphenylmaleimide; and the like. These can be used alone or in an admixture thereof. Among them, N-phenylmaleimide is preferable from the viewpoint that it is comparatively low cost and easily obtained.

When the amount of the above-mentioned maleimide derivative in the copolymerizable component is too large, there is a tendency that the amount of α-methylstyrene relatively becomes small, so that crosslinking effect is not sufficiently exhibited. Accordingly, it is desired that 50% by mole of the maleimide derivative is contained in the copolymerizable component containing the maleimide derivative and α-methylstyrene.

On the contrary, when the amount of α-methylstyrene in the copolymerizable component is too large, many continuous parts of at least two α-methylstyrenes exist and these neighboring α-methylstyrenes are cut by the heating. As a result, there is a tendency that the obtained copolymer is cut everywhere and the molecular weight of the copolymer is considerably lowered, so that reinforcing effect based on the maleimide derivative-α-methylstyrene copolymer is not sufficiently exhibited. Accordingly, it is desired that the amount of α-methylstyrene in the copolymerizable component is at most 80% by mole.

As aforementioned, when the above-mentioned copolymerizable component is composed of the maleimide derivative and α-methylstyrene, it is desired that the amount of the maleimide derivative in the copolymerizable component is 20 to 50% by mole and the amount of α-methylstyrene in the copolymerizable component is 50 to 80% by mole.

In order to improve reinforcing effect and control a crosslinking point with the N,N-dimethylacrylamide polymer, a hydrophobic monomer can be contained in the above-mentioned copolymerizable component.

Typical examples of the above-mentioned hydrophobic monomer are, for instance, a (meth)acrylic acid alkyl ester of which an alkyl group has 1 to 18 carbon atoms, such as methyl (meth)acrylate, ethyl (meth)acrylate, propyl (meth) acrylate, butyl (meth)acrylate, hexyl (meth)acrylate, decyl (meth)acrylate, dodecyl (meth)acrylate or tetradecyl (meth) acrylate; styrene; an alkylstyrene of which an alkyl group has 1 to 4 carbon atoms, such as isopropylstyrene or t-butylstyrene; an itaconic acid alkyl ester of which an alkyl group has 1 to 4 carbon atoms, such as propyl itaconate; a crotonic acid alkyl ester of which an alkyl group has 1 to 4 carbon atoms, such as propyl crotonate; an aliphatic carboxylic acid vinyl ester such as vinyl acetate or vinyl propionate; isopropenyl acetate; an anhydride such as maleic anhydride; and the like. These are used alone or in an admixture thereof.

Among the above-mentioned hydrophobic monomers, when the (meth)acrylic acid alkyl ester, the itaconic acid alkyl ester or the crotonic acid alkyl ester is used, its alkyl group may be, as occasion demands, a fluorine-substituted alkyl group such as difluoroethyl group, trifluoroethyl group, trifluoroethyl group, trifluorobutyl group, trifluoropentyl group, trifluorohexyl group, pentafluorobutyl group or pentafluoroheptyl group.

When the amount of the above-mentioned hydrophobic monomer is too large, there is a tendency that the amount of α-methylstyrene relatively becomes small, so that the amount of the closslinking point becomes small and reinforcing property is lowered. Accordingly, it is desired that the amount of the hydrophobic monomer in the above-mentioned copolymerizable component is at most 40% by mole.

Accordingly, when the hydrophobic monomer is contained in the copolymerizable component which composes the maleimide derivative-α-methylstyrene unit, it is desired that the above-mentioned copolymerizable component comprises 20 to 50% by mole, preferably 30 to 50% by mole of the maleimide derivative, 20 to 80% by mole, preferably 30 to 50% by mole of α-methylstyrene and 0 to 40% by mole, preferably 0 to 30% by mole of the hydrophobic monomer.

The above-mentioned copolymerizable component comprising the maleimide derivative, α-methylstyrene and the hydrophobic monomer which is used as occasion demands can be polymerized by using a usual radical polymerization initiator.

Examples of the above-mentioned radical polymerization initiator are, for instance, 2,2'-azobis(2,4-dimethylvaleronitrile), 2,2'-azobis(4-methoxy-2,4-dimethylvaleronitrile), azobisisobutyronitrile, a peroxide such as benzoyl peroxide, t-butyl hydroperoxide or cumene hydroperoxide, a redox polymerization initiator and the like. Among these polymerization initiators, from the viewpoint that the polymerization can be carried out at relatively low temperature, 2,2'-azobis(2,4-dimethylvaleronitrile) and 2,2'-azobis(4-methoxy-2,4-dimethylvaleronitrile) are preferable.

It is desired that the amount of the above-mentioned polymerization initiator is, as usual, 0.001 to 1 mole or so, preferably 0.01 to 0.5 mole or so based on 100 moles of the above-mentioned copolymerizable component.

The polymerization reaction of the above-mentioned copolymerizable component can be carried out by both a solution polymerization method and a bulk polymerization method. In order to efficiently proceed the polymerization reaction, it is desired that the solution polymerization method is employed. When the solution polymerization method is employed, as a solvent, a solvent which dissolves the copolymerizable component and a copolymer obtained therefrom is preferably used. Typical examples of the solvent are, for instance, tetrahydrofuran, benzene, 1,4-dioxane, toluene, xylene, dimethylsulfoxide, dimethylformamide and the like. It is desired that the amount of the above-mentioned solvent is adjusted so that the concentration of the above-mentioned copolymerizable component is 30 to 95% by weight or so.

Conditions of the polymerization reaction are not particularly limited, and usually, it is desired that the reaction is carried out in an atmosphere of an inert gas such as nitrogen gas or argon gas, the polymerization temperature is 0° to 100° C. or so, preferably 25° to 60° C. or so and the polymerization time is several hours to about ten hours.

As aforementioned, by polymerizing the above-mentioned copolymeriz able component, the maleimide-derivative-α-methylstyrene copolymer is prepared.

Moreover, the molecular weight of the obtained copolymer can be widely varied by properly controlling various polymerization conditions such as the kinds of the polymerization initiator and the amount thereof, the amount of the solvent used during polymerization, the polymerization time and the polymerization temperature.

After finishing the polymerization reaction, it is desired that an untouched reaction solution containing the obtained maleimide-derivative-α-methylstyrene copolymer is dried and non-reacted monomers and solvents are removed therefrom, or that the solution is purified by a reprecipitation method. That is, after the reaction solution obtained by the above-mentioned polymerization reaction is diluted by using a good solvent of the above-mentioned copolymer, such as acetone or tetrahydrofuran, the solution is added into large amount of a poor solvent of the copolymer, such as n-hexane, various ether or a lower alcohol such as methanol or ethanol, and the obtained copolymer is precipitated, so that non-reacted monomers and the like can be removed therefrom.

The above-mentioned maleimide derivative-α-methylstyrene copolymer is colorless and transparent in a state of a tetrahydrofuran solution in which the copolymer is dissolved, and the copolymer is white powder in a dried state.

The molecular weight of the above-mentioned maleimide derivative-α-methylstyrene copolymer can be examined in accordance with gel permeation chromatography (hereinafter referred to as GPC).

The larger the molecular weight of the above-mentioned maleimide derivative-α-methylstyrene copolymer is, the better mechanical property of the obtained ocular lens material becomes. However, in the case that the molecular weight of the maleimide derivative-α-methylstyrene copolymer is too large, there is a tendency that it is difficult for the copolymer to uniformly mix with N,N-dimethylacrylamide when it is tried to dissolve the copolymer in N,N-dimethylacrylamide. Accordingly, it is desired that the weight average molecular weight of the above-mentioned maleimide derivative-α-methylstyrene copolymer is 1000 to 2000000 or so, preferably 50000 to 1000000 or so.

Next, the above-mentioned maleimide derivative-α-methylstyrene copolyemr is dissolved in N,N-dimethylacrylamide and the N,N-dimethylacrylamide is polymerized to give a polymer composition.

When the amount of N,N-dimethylacrylamide is too small, there is a tendency that the improvement of water content becomes insufficient, and also, when the amount of N,N-dimethylacrylamide is too large, there is a tendency that sufficient reinforcing effect is not exhibited. Accordingly, it is desired that the proportion of N,N-dimethylacrylamide to the maleimide derivative-α-methylstyrene copolymer (N,N-dimethylacrylamide:maleimide derivative-α-methylstyrene copolymer (weight ratio)) is 60:40 to 95:5, preferably 70:30 to 90:10.

As occasion demends, other monomers can be added to the above-mentioned N,N-dimethylacrylamide.

The above-mentioned other monomers can be properly selected and used in accordance with properties to be imparted to the obtained ocular lens material.

For instance, in order to further impart reinforcing effect to the obtained ocular lens material, it is desired that there are used as the above-mentioned other monomers, for instance, a (meth) acrylic acid alkyl ester of which an alkyl group has 1 to 18 carbon atoms, such as methyl (meth) acrylate, ethyl (meth)acrylate, propyl (meth)acrylate, butyl (meth)acrylate, hexyl (meth)acrylate, decyl (meth)acrylate, dodecyl (meth)acrylate or tetradecyl (meth)acrylate; and the like.

For instance, in order to improve refractive index, it is desired that there are used as the other monomers, styrene; an alkylstyrene of which an alkyl group has 1 to 4 carbon atoms, such as isopropylstyrene or t-butylstyrene; and the like.

For instance, in order to control water content and improve elongation ratio, it is desired that there are used as the other monomers, an itaconic acid alkyl ester of which an alkyl group has 1 to 4 carbon atoms, such as propyl itaconate; a crotonic acid alkyl ester of which an alkyl group has 1 to 4 carbon atoms, such as propyl crotonate; an aliphatic carboxylic acid vinyl ester such as vinyl acetate or vinyl propionate; isopropenyl acetate; a N-vinyllactarn such as N-vinylpyrrolidone, N-vinylpiperidone or α-methylene-N-methylpyrrolidone; and the like.

Furthermore, for instance, in order to more improve mechanical strength of the ocular lens material containing the obtained polymer by crosslinking the N,N-dimethylacrylamide unit in the polymer to give a material only showing more extremely small size change, and in order to preferably produce desired ocular lenses from the ocular lens material by a mechanical processing method, a molding method or a method using the combination of the mechanical processing method and the molding method, it is desired that a crosslinkable monomer is used as the other monomer. Examples of the crosslinkable monomer are, for instance, ethylene glycol di(meth)acrylate, diethylene glycol di(meth)acrylate, triethylene glycol di(meth)acrylate, tetraethylene glycol di(meth)acrylate, polyethylene glycol di(meth)acrylate, allyl (meth)acrylate, triallyl isocyanurate, vinyl (meth)acrylate, divinylbenzene and the like.

The above-mentioned other monomer can be used alone or in an admixture thereof.

When the above-mentioned other monomer is used, N,N-dimethylacrylamide in a partial amount may be substituted with the above-mentioned other monomer. When the amount of N,N-dimethylacrylamide is too small, there is a tendency that it is difficult for the maleimide derivative-α-methylstyrene copolymer to be dissolved in a mixture of N,N-dimethylacrylamide and the other monomers. Therefore, it is desired that the amount of N,N-dimethylacrylamide is at least 20% by weight, preferably at least 25% by weight of the total amount of N,N-dimethylacrylamide and the other monomers, that is, the amount of the other monomer is at most 80% by wight, preferably at most 75% by weight of the total amount. Also, when the amount of the other monomer is too small, there is a tendency that effects based on the use of the other monomer are not sufficiently exhibited. Therefore, it is desired that the amount of the other monomer is at least 5% by weight, preferably at least 10% by weight of the above-mentioned total amount, that is, the amount of N,N-dimethylacrylamide is at most 95% by weight, preferaby at most 90% by weight of the total amount.

The above-mentioned maleimide derivative-α-methylstyrene copolymer, N,N-dimethylacrylamide and the other monomer which is used as occasion demands can be polymerized by using a usual radical polymerization initiator.

Examples of the above-mentioned radical polymerization initiator are, for instance, 2,2'-azobis(2,4-dimethylvaleronitrile), 2,2'-azobis(4-methoxy-2,4-dimethylvaleronitrile), azobisisobutyronitrile, a peroxide such as benzoyl peroxide, t-butyl hydroperoxide or cumene hydroperoxide, a redox polymerization initiator and the like. Among these polymerization initiator, from the viewpoint that the polymerization can be carried out at relatively low temperature, 2,2'-azobis(2,4-dimethylvaleronitrile) and 2,2'-azobis(4-methoxy-2,4-dimethylvaleronitrile) are preferable.

It is desired that the amount of the above-mentioned polymerization initiator is, as usual, 0.001 to 1 part by weight or so, preferably 0.01 to 0.5 part by weight or so based on 100 parts by weight of the total amount of the above-mentioned maleimide derivative-α-methylstyrene copolymer, N,N-dimethylacrylamide and the other monomer which is used as occasion demands.

The above-mentioned polymerization can be carried out by dissolving the maleimide derivative-α-methylstyrene copolymer in N,N-dimethylacrylamide and the other monomer which is used as occasion demends and adding the radical polymerization initiator thereto.

The polymerization reaction can be carried out, as usual, in the range of room temperature to 120° C. or so, preferably 25° to 80° C. or so, at a constant temperature or by increasing temperature. When the temperature is increased, it is desired that the polymerization reaction is carried out at a prescribed temperature for several hours to several tens of hours with increasing temperature by stages.

As aforementioned, by carrying out the polymerization reaction, the polymer composition is prepared.

Next, the obtained polymer composition is heated to 130° to 250° C., preferably 160° to 250° C. At this stage, as mentioned above, by heating the polymer composition, the neighboring α-methylstyrene units in the maleimide derivative-α-methylstyrene copolymer are cut, so that one α-methylstyrene unit and the other α-methylstyrene unit which are cut with each other bond to the N,N-dimethylacrylamide polymers, respectively.

Moreover, when the heating temperature for the above-mentioned polymer composition is lower than the above-mentioned lower limit, it is difficult for the composition to melt, so that a uniform ocular lens material cannot be produced. Also, when the heating temperature is higher than the above-mentioned upper limit, the ocular lens material is colored and deteriorated due to overheating.

By heating the above-mentioned polymer composition, the ocular lens material containing the polymer having the maleimide derivative-α-methylstyrene unit represented by the formula (I):

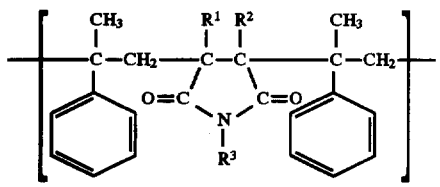

wherein each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms, and the N,N-dimethylacrylamide unit represented by the formula (II):

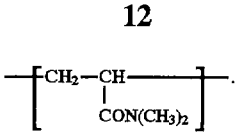

In the present invention, when the crosslinkable monomer is not used, an example of the above-mentioned N,N-dimethylacrylamide unit represented by the formula (II) is, for instance, a unit represented by the formula (III):

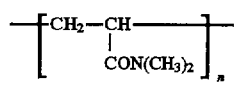

wherein n is 100 to 100000 on the average.

In the above-mentioned formula (III) which represents the N,N-dimethylacrylamide unit, n shows an average degree of polymerization of the N,N-dimethylacrylamide polymer. When n is too small, there is a tendency that the N,N-dimethylacrylamide polymer easily elutes as a non-crosslinked polymer, and also, it is difficult to prepare a polymer having too large degree of polymerization in accordance with a usual radical polymerization. Accordingly, n is, as usual, 100 to 100000, preferably 500 to 10000. Moreover, the above-mentioned average degree of polymerization is a theoretical value which is calculated with assuming that all the used polymerization initiators take part in the polymerization and the polymerization is carried out without the chain transfer and the reaction for stopping recombination as to radicals with each other.

Also, in order to prepare a unit comprising the above-mentioned N,N-dimethylacrylamide unit represented by the formula (II), which is crosslinked with the crosslinkable monomer, during the polymerization of the above-mentioned maleimide derivative-α-methylstyrene copolymer and N,N-dimethylacrylamide, N,N-dimethylacrylamide in a partial amount may be substituted with the crosslinkable monomer which is the other monomer. When the polymer which is contained in the ocular lens material of the present invention has a unit crosslinked with the crosslinkable monomer, as the N,N-dimethylacrylamide unit, there are the advantage that the ocular lens material has a higher mechanical strength and only shows a more extremely small size change based on pH change of a solution under the hydrated state, and the advantage that ocular lenses can be easily produced from the ocular lens material by a mechanical processing method, a molding method or a method using the combination of these methods.

When the ocular lens material of the present invention is a material having the above-mentioned unit represented by the formula (III) as the N,N-dimethylacrylamide unit, for instance, an ocular lens may be produced by heating and melting the above-mentioned polymer composition, injecting this into a suitable mold and carrying out the molding. Also, when the ocular lens material of the present invention is a material having the unit crosslinked with the crosslinkable monomer as the N,N-dimethylacrylamide unit, for instance, an ocular lens may be produced by carrying out the molding by a mechanical processing method, a molding method using a mold corresponding the desired shape, a method using the combination of these methods, or the like.

By using the ocular lens material of the present invention and applying the conventional method for molding such as a press working method or an injection molding method, ocular lenses having desired shape, such as contact lenses and intraocular lenses can be produced on a large scale. As aforementioned, it is considered that these methods for molding can be applyed to the ocular lens material of the present invention because polymer type radicals of the maleimide derivative-α-methylstyrene are generated during the melting and these radicals are radically chained to the N,N-dimethylacrylamide polymer during the molding and processing, and crosslinked in the above-mentioned polymer which composes the ocular lens material.

Also, because the ocular lens material of the present invention has a structure comprising the N,N-dimethylacrylamide unit which is, as mentioned above, crosslinked with the maleimide derivative-α-methylstyrene copolymer, the N,N-dimethylacrylamide unit never elutes into water when the material is hydrated. Also, because macroscopic phase separation of the maleimide derivative-α-methylstyrene copolymer and the N,N-dimethylacrylamide polymer is never generated in the ocular lens material, the ocular lens material has an excellent transparency. Furthermore, because the polymer which composes the ocular lens material of the present invention does not have ionic groups such as carboxyl group and sulfonic acid group, the ocular lens material only shows an extremely small size change based on the change of the concentration and pH of a solution in which the material is immersed when the material is hydrated.

As aforementioned, even if the ocular lens material of the present invention is hydrated, cloudiness in white is never generated in the ocular lens material, and unlike conventional materials, mechanical strength of the ocular lens material is never remarkably lowered, and the ocular lens material has a high water content. In addition, the ocular lens material has an excellent transparency and a high mechanical strength, and further only shows an extremely small size change based on pH change of a solution under the hydrated state.

Accordingly, the ocular lens material of the present invention can be preferably used for, in particular, water-absorptive contact lenses.

Next, the ocular lens material and the process for producing the same of the present invention are more specifically explained on the basis of the Examples, however, the present invention is not limited to only the Examples.

REFERENCE EXAMPLE 1

[Preparation of maleimide derivative-α-methylstyrene copolymer]

In 150 g of tetrahydrofuran (hereinafter referred to as "THF") were dissolved 59.1 g (0.5 mole) of α-methylstyrene and 86.6 g (0.5 mole) of N-phenylmaleimide (monomer concentration: about 50% by weight). Thereto was added 2.2 mmoles of 2,2'-azobis(2,4-dimethylvaleronitrile) (hereinafter referred to as "V-65") as a polymerization initiator, and the polymerization was carried out in an atmosphere of nitrogen at 40° C. for 24 hours to give a viscous liquid.

The obtained viscous liquid was diluted with about 350 g of THF, and the diluted liquid was added to 5 l of methanol to give a precipitate. The precipitate was filtered out and dried to give 142.8 g of a white powdery solid (N-phenylmaleimide-α-methylstyrene copolymer) (yield: 98.0%).

The molecular weight of the obtained copolymer was measured in accordance with GPC (GPC analysis apparatus (made by SHIMADZU CORPORATION), detector: RID-6A (made by SHIMADZU CORPORATION), column: shim-pach GPC-806 type (made by SHIMADZU CORPORATION), flow rate: 1.0 ml/min., column temperature: 40° C., solvent: THF). The number average molecular weight (hereinafter referred to as "Mn") and the weight average molecular weight (hereinafter referred to as "Mw") are shown in Table 1.

REFERENCE EXAMPLES 2 TO 10 AND COMPARATIVE REFERENCE EXAMPLE 1

In Reference Example 1, the polymerization was carried out and N-phenylmaleimide-α-methylstyrene copolymers were prepared in the same manner as in Reference Example 1 except that the composition of the copolymer and the polymerization condition were changed to those shown in Table 1. The molecular weight of the obtained N-phenylmaleimide-α-methylstyrene copolymers was measured in the same manner as in Reference Example 1. The results are shown in Table 1.

REFERENCE EXAMPLES 11 TO 12

In Reference Example 1, N-phenylmaleimide-α-methylstyrene copolymers were prepared in the same manner as in Reference Example 1 except that the polymerization was carried out by using 150 g of dimethylsulfoxide (hereinafter referred to as "DMSO") (Reference Example 11) or 150 g of dimethylformamide (hereinafter referred to as "DMF") (Reference Example 12) instead of 150 g of THF and changing the amount of V-65 from 2.2 mmoles to 1.1 mmoles, and that the viscous liquid was diluted with about 350 g of DMSO (Reference Example 11) or 350 g of DMF (Reference Example 12) instead of about 350 g of THF. The molecular weight of the obtained N-phenylmaleimide-α-methylstyrene copolymers was measured in the same manner as in Reference Example 1. The results are shown in Table 1.

TABLE 1

| Reference Example No. | 1 | 2 | 3 | 4 | 5 | 6 | 7 | 8 | 9 | 10 | 11 | 12 | Com. Ref. Ex. 1 |
|---|---|---|---|---|---|---|---|---|---|---|---|---|---|
| Composition of copolymer (mole) | | | | | | | | | | | | | |
| α-Methylstyrene | 0.5 | 0.5 | 0.4 | 0.3 | 0.45 | 0.4 | 0.5 | 0.6 | 0.4 | 0.5 | 0.5 | 0.5 | — |
| N-Phenylmaleimide | 0.5 | 0.4 | 0.4 | 0.4 | 0.45 | 0.3 | 0.4 | 0.2 | 0.3 | 0.3 | 0.5 | 0.5 | — |
| Maleic anhydride | — | 0.1 | — | — | — | — | — | — | — | — | — | — | 0.5 |
| Methyl methacrylate | — | — | 0.2 | 0.3 | — | — | — | — | — | — | — | — | 0.5 |
| Styrene | — | — | — | — | 0.1 | 0.3 | — | — | — | — | — | — | — |
| Vinyl acetate | — | — | — | — | — | — | — | 0.2 | 0.3 | — | — | — | — |
| n-Hexyl methacrylate | — | — | — | — | — | — | 0.1 | — | — | — | — | — | — |
| Cyclohexyl methacrylate | — | — | — | — | — | — | — | — | — | 0.2 | — | — | — |

TABLE 1-continued

| Reference Example No. | 1 | 2 | 3 | 4 | 5 | 6 | 7 | 8 | 9 | 10 | 11 | 12 | Com. Ref. Ex. 1 |
|---|---|---|---|---|---|---|---|---|---|---|---|---|---|
| Polymerization condition | | | | | | | | | | | | | |
| Monomer concentration (% by weight) | 50 | 50 | 50 | 50 | 60 | 50 | 50 | 35 | 50 | 50 | 50 | 50 | 70 |
| V-65 (mmoles) | 2.2 | 2.0 | 5.0 | 3.0 | 5.0 | 5.0 | 6.0 | 6.0 | 7.0 | 5.0 | 1.1 | 1.1 | 1.2 |
| Polymerization temperature (°C.) | 40 | 40 | 45 | 45 | 45 | 45 | 45 | 45 | 45 | 45 | 40 | 40 | 35 |
| Polymerization time (hr) | 24 | 24 | 48 | 48 | 48 | 48 | 24 | 24 | 24 | 24 | 24 | 24 | 48 |
| Physical properties of copolymer | | | | | | | | | | | | | |
| Mn | 43900 | 34400 | 25300 | 16700 | 22000 | 18800 | 18200 | 12600 | 16600 | 17600 | 96000 | 92000 | 14200 |
| Mw × 10$^{-4}$ | 15.1 | 7.7 | 11.0 | 7.6 | 10.3 | 12.2 | 8.5 | 5.9 | 7.7 | 8.5 | 24.0 | 19.1 | 8.5 |

EXAMPLE 1

To 78 g of N,N-dimethylacrylamide (hereinafter referred to as "NNDMA") and 10 g of methyl methacrylate (hereinafter referred to as "MMA") was added 12 g of the white powdery solid (N-phenylmaleimide-α-methylstyrene copolymer) obtained in Reference Example 1, and they were stirred and mixed together with so that the solid was uniformly dissolved in these monomers. After that, 0.25 g of V-65 was added to the mixture and the polymerization was carried out at 40° C. for 24 hours to give a polymer composition.

Moreover, on the basis of the amount of the added polymerization initiator (V-65), it is presumed that a polymer (NNDMA polymer) composed of NNDMA and MMA, having an average degree of polymerization of 881 was prepared. The average degree of polymerization is shown in Table 2.

After the obtained polymer composition was ground, heated to 190° C. and melted, the press molding was carried out in a plate-shaped mold of 10 cm×10 cm, having a thickness of 0.1 mm at 180° C. under the pressure of 250 kg/cm$^2$ to give a film.

The obtained film was hydrated with distilled water so as to be an equilibrium state and boiled for 3 hours, and after non-reacted monomers and non-crosslinked polymers were eluted, its physical properties were measured. The results are shown in Table 2. Moreover, the physical properties were measured in accordance with the following methods.

(1) Water content

The weight of the film in the hydrated equilibrium state ($W_o$ (g)) and the weight of the dried film ($W_1$(g)) are measured, and water content is determined based on the equation:

$$[\text{Water content (\% by weight)}] = \frac{W_o - W_1}{W_o} \times 100$$

(2) Tensile test

As a testing apparatus, SV-201 type tensile tester (made by IMADA MANUFACTURING COMPANY) is used, and the size and shape of the test piece are arranged that the width is about 2.0 mm, the length is about 15.0 mm and the shape is the strip, respectively.

(i) Tensile strength

By the above-mentioned tester, the maximum tensile force (FB) before the test piece is broken is read, and tensile strength (TB) is determined based on the equation:

$$[\text{Tensile strength } TB(\text{kgf/cm}^2)] = \frac{[\text{Maximum tensile force } FB \text{ (kgf)}]}{[\text{Thickness of test piece (cm)}] \times [\text{Width of test piece (cm)}]}$$

(ii) Elongation percentage at breaking

When the test piece is furnished to the tester, the distance between two grips in the state of non-flexure of the test piece ($L_o$(mm)) is read. The moved length of the grip (length of the elongated test piece: $L_1$(mm)) is read from an output stress-strain diagram on a X-Y recorder, and elongation percentage at breaking is determined based on the equation:

$$[\text{Elongation percentage at breaking (\%)}] = \frac{L_1}{L_o} \times 100$$

(3) Visible ray permeability

Permeability (%) of visible ray (wavelength: 380 to 800 nm) is measured by using a self-recording spectrophotometer (UV-240, made by SHIMADZU CORPORATION). Moreover, when a film is used as a contact lens, it is desired that permeability in the visible ray range of the film having a thickness of 0.2 mm is at least 90%.

(4) Elution test

In accordance with "(3) Eluted substance by water, E. Testing method of potassium permanganate-reducible substance" prescribed in the item of "IV Elution test" described in "Standards as to contact lenses for compensation for visual acuity" of Notification No. 302 of the Ministry of Welfare, dated Aug. 10, 1970, the measurement is carried out.

Moreover, it is acceptable that the difference between the amount of potassium permanganate solution consumed in water after the treatment of the film and the amount of potassium permanganate solution consumed in water before the treatment of the film is at most 2.0 ml.

(5) Size change

After the film was boiled in isotonic sodium chloride solution (pH 6.0) described in The Pharmacopoeia of Japan XII, it was allowed to stand at 20° C. for 1 day. The film is punched to a circle with a punch having a diameter of 15.0 mm to give a circular plate.

Next, the above-mentioned circular plate was immerced in ISO (International Organization for Standardization) isotonic sodium chloride solution (phosphoric acid buffer, pH 7.4), and it was allowed to stand at 20° C. for 1 day. After that, the diameter of the circular plate D (mm) is measured, and percentage of size change is determined based on the equation:

$$[\text{Percentage of size change (\%)}] = \frac{D - 15.0}{15.0} \times 100$$

EXAMPLES 2 TO 18

In Example 1, the polymerization was carried out and polymer compositions were prepared in the same manner as in Example 1 except that the composition was changed to those shown in Tables 2 to 3.

The average degree of polymerization of polymers (NNDMA polymers) composed of NNDMA and other monomers, which are contained in the obtained polymer compositions (presumed value on the basis of the amount of V-65) is shown in Tables 2 to 3.

After the obtained polymer compositions were ground, heated to 190° C. (Examples 2 to 16 and 18) or 230° C. (Example 17) and melted, the press molding was carried out in a plate-shaped mold of 10 cm×10 cm, having a thickness of 0.1 mm at 180° C. trader the pressure of 250 kg/cm² to give films.

The obtained films were hydrated with distilled water so as to be an equilibrium state and boiled for 3 hours, and after non-reacted monomers and non-crosslinked polymers were eluted, their physical properties ((1) to (5)) were measured in the same manner as in Example 1. The results are shown in Table 2 to 3.

EXAMPLES 19 TO 26

In Example 1, after the components were stirred and mixed together with in the same manner as in Example 1 except that the composition was changed to those shown in Table 4, a polypropylene test tube (inside diameter: 20 mm) was charged with the mixture and thereto was added azobisisobutylonitrile (hereinafter referred to as "AIBN") in an amount shown in Table 4, and then, the polymerization was carried out at 40° C. for 24 hours to give polymer compositions.

The obtained polymer compositions were heated at 50° C. for 2 hours, at 60° C. for 2 hours, at 70° C. for 2 hours, at 80° C. for 1 hour and from 90° to 120° C. for 2 hours to give rod-shaped polymers.

The obtained rod-shaped polymers were subjected to cutting process to give plates having a thickness in the hydrated state of 0.2 ram, and their physical properties ((1) to (5)) were measured in the same manner as in Example 1 except that the plates were used instead of the film. Also, as one of the physical properties of the plates, coefficient of linear swelling and rubber hardness were measured in accordance with the following methods. The results are shown in Table 4.

(6) Coefficient of linear swelling

When the rod-shaped polymer is subjected to cutting process, a circular plate is produced and the diameter of the plate ($D_o$ (mm)) is measured. Next, after the plate is hydrated in the same manner as the film in Example 1, the diameter of the plate in isotonic sodium chloride solution at 20° C. ($D_1$ (mm)) is measured and coefficient of linear swelling is determined based on the equation:

[Coefficient of linear swelling]=$D_1/D_o$ (7) Rubber hardness

When the rod-shaped polymer is subjected to cutting process, three circular plates having a diameter of at least 10 mm and a thickness of at least 4 mm are produced. Next, after these plates are hydrated in the same manner as in Example 1, these three plates are laminated together with and rubber hardness is measured by using a rubber hardness tester (GS-710, made by TECLOCK CORPORATION).

COMPARATIVE EXAMPLES 1 TO 2

In order to compare with Examples, physical properties ((1) and (2)) of water-absorptive soft contact lenses on the market [trade name: MENICON SOFT MA, made by Menicon Co., Ltd. (Comparative Example 1), or trade name: Breath O, made by Toray Industries, Inc. (Comparative Example 2)] were measured in the same mariner as in Example 1. The results are shown in Table 5.

COMPARATIVE EXAMPLE 3

In Example 1, the polymerization was carried out and a polymer composition was prepared in the same manner as in Example 1 except that the composition was changed to those shown in Table 5.

The average degree of polymerization of a polymer composed of NNDMA and MMA, which is contained in the obtained polymer composition (presumed value on the basis of the amount of V-65) is shown in Table 5.

After the obtained polymer composition was ground, heated to 190° C. and melted, the press molding was carried out in a plate-shaped mold of 10 cm×10 cm, having a thickness of 0.1 mm at 180° C. under the pressure of 250 kg/cm² to give a film.

The obtained film was hydrated with distilled water so as to be an equilibrium state and boiled for 3 hours, and after non-reacted monomers and non-crosslinked polymers were eluted, its physical properties ((3) and (5)) were measured in the same manner as in Example 1. The results are shown in Table 5.

Moreover, each code in Table 3 and Table 4 is as follows:

NVP: N-Vinylpyrrolidone
cyHMA: Cyclohexyl methacrylate
nBMA: n-Butyl methacrylate
VAc: Vinyl acetate
EDMA: Ethylene glycol dimethacrylate
DVB: Divinylbenzene

TABLE 2

| Example No. | 1 | 2 | 3 | 4 | 5 | 6 | 7 | 8 |
|---|---|---|---|---|---|---|---|---|
| Composition (part(s) by weight) | | | | | | | | |
| Maleimide derivative-α-methylstyrene | 1 | 1 | 2 | 2 | 3 | 4 | 5 | 6 |

TABLE 2-continued

| Example No. | 1 | 2 | 3 | 4 | 5 | 6 | 7 | 8 |
|---|---|---|---|---|---|---|---|---|
| copolymer (Reference Example No) and its amount (in parentheses) | (12) | (15) | (12) | (15) | (10) | (10) | (12) | (12) |
| NNDMA | 78 | 75 | 70 | 75 | 80 | 80 | 78 | 78 |
| MMA | 10 | 10 | 18 | 10 | 10 | 10 | 10 | 10 |
| V-65 | 0.25 | 0.26 | 0.26 | 0.26 | 0.32 | 0.36 | 0.38 | 0.29 |
| Average degree of polymerization of polymer composed of NNDMA and other monomers (presumed value) | 881 | 818 | 846 | 818 | 704 | 626 | 579 | 759 |
| Physical properties | | | | | | | | |
| Water content (% by weight) | 76.5 | 70.5 | 73.5 | 72.5 | 78.0 | 80.0 | 74.5 | 74.5 |
| Tensile strength (kgf/cm$^2$) | 16.7 | 21.6 | 19.6 | 20.1 | 10.6 | 7.8 | 18.8 | 22.4 |
| Elongation percentage at breaking (%) | 256.7 | 205.2 | 283.4 | 213.7 | 197.2 | 200.5 | 246.7 | 255.7 |
| Visible ray permeability (%) | 91.5 | 93.5 | 90.5 | 94.2 | 90.0 | 90.0 | 95.0 | 91.2 |
| Elution test (difference between the amounts of consumed potassium permanganate solution) (ml) | 1.34 | 0.84 | 1.65 | 1.05 | 1.85 | 1.75 | 1.55 | 1.55 |
| Percentage of size change (%) | 0.6 | 0 | 1.5 | 2.0 | 0.3 | 0.6 | 0.3 | 0.3 |

TABLE 3

| Example No. | 9 | 10 | 11 | 12 | 13 | 14 | 15 | 16 | 17 | 18 |
|---|---|---|---|---|---|---|---|---|---|---|
| Composition (part(s) by weight) | | | | | | | | | | |
| Maleimide derivative-α-methylstyrene copolymer (Reference Example No) and its amount (in parentheses) | 7 (16) | 8 (10) | 9 (12) | 10 (12) | 1 (12) | 1 (12) | 1 (12) | 1 (15) | 5 (12) | 5 (12) |
| NNDMA | 76 | 80 | 78 | 78 | 70 | 83 | 83 | 60 | 28 | 83 |
| NVP | — | — | — | — | — | — | — | — | 50 | — |
| MMA | 8 | 10 | 10 | 10 | 13 | — | — | 20 | 10 | — |
| cyHMA | — | — | — | — | 5 | 5 | — | — | — | 5 |
| nBMA | — | — | — | — | — | — | 5 | — | — | — |
| VAc | — | — | — | — | — | — | — | 5 | — | — |
| V-65 | 0.3 | 0.32 | 0.28 | 0.3 | 0.25 | 0.2 | 0.2 | 0.2 | 0.3 | 0.3 |
| Average degree of polymerization of polymer composed of NNDMA and other monomers (presumed value) | 700 | 704 | 786 | 734 | 860 | 1077 | 1083 | 1072 | 689 | 718 |
| Physical properties | | | | | | | | | | |
| Water content (% by weight) | 70.5 | 81.5 | 78.5 | 75.0 | 70.5 | 81.5 | 81.5 | 67.0 | 76.5 | 73.0 |
| Tensile strength (kgf/cm$^2$) | 19.3 | 9.4 | 12.5 | 18.5 | 19.8 | 7.8 | 8.5 | 21.0 | 18.9 | 44.7 |
| Elongation percentage at breaking (%) | 220.6 | 260.0 | 243.6 | 258.0 | 260.2 | 276.0 | 150.3 | 150.3 | 260.6 | 223.4 |
| Visible ray permeability (%) | 95.4 | 90.6 | 91.2 | 90.5 | 90.2 | 92.5 | 92.5 | 90.0 | 91.8 | 93.6 |
| Elution test (difference between the amounts of consumed potassium permanganate solution) (ml) | 0.95 | 1.60 | 1.60 | 1.35 | 1.25 | 1.86 | 1.80 | 1.05 | 1.65 | 1.55 |
| Percentage of size change (%) | 0 | 0.8 | 0.3 | 0.3 | 0 | 0.7 | 0.7 | 0 | 0.5 | 0.5 |

TABLE 4

| Example No. | 19 | 20 | 21 | 22 | 23 | 24 | 25 | 26 |
|---|---|---|---|---|---|---|---|---|
| Composition (part(s) by weight) | | | | | | | | |
| Maleimide derivative-α-methylstyrene copolymer (Reference Example No) and its amount (in parentheses) | 1 (13.3) | 1 (13.8) | 1 (14) | 1 (14) | 11 (13.3) | 12 (13.3) | 1 (14) | 1 (20) |
| NNDMA | 69.4 | 74.1 | 78 | — | 69.4 | 69.4 | 69 | — |
| MMA | 17.3 | 12.1 | 8 | — | 17.3 | 17.3 | 17 | — |
| VAc | — | — | 8 | — | — | — | 10 | — |
| NVP | — | — | — | 78 | — | — | — | 70 |
| EDMA | 0.5 | 0.5 | 0.5 | 0.5 | 0.5 | 0.5 | 0.5 | — |
| DVB | — | — | — | — | — | — | — | 0.1 |
| AIBN | 0.3 | 0.3 | 0.15 | 0.1 | 0.1 | 0.05 | 0.1 | 0.1 |

TABLE 4-continued

| Example No. | 19 | 20 | 21 | 22 | 23 | 24 | 25 | 26 |
|---|---|---|---|---|---|---|---|---|
| Physical properties | | | | | | | | |
| Water content (% by weight) | 72.8 | 74.8 | 75.6 | 73.6 | 71.6 | 71.3 | 71.3 | 61.6 |
| Tensile strength (kgf/cm$^2$) | 13.9 | 12.1 | 12.7 | 11.1 | 18.7 | 20 | 17.4 | 32.3 |
| Elongation percentage at breaking (%) | 168 | 127 | 159 | 271 | 232 | 296 | 218 | 182 |
| Visible ray permeability (%) | 96.0 | 96.0 | 94.0 | 92.0 | 96.0 | 96.0 | 95.0 | 93.0 |
| Elution test (difference between the amounts of consumed potassium permanganate solution) (ml) | 0.90 | 1.02 | 1.22 | 1.80 | 0.85 | 0.70 | 0.80 | 0.83 |
| Percentage of size change (%) | 0.2 | 0.2 | 0.2 | 0.2 | 0.2 | 0.2 | 0.2 | 0.4 |
| Coefficient of linear swelling | 1.54 | 1.57 | 1.59 | 1.36 | 1.54 | 1.54 | 1.54 | 1.15 |
| Rubber hardness | 32 | 28 | 31 | 15 | 33 | 35 | 33 | 51 |

TABLE 5

| Comparative Example No. | 1 | 2 | 3 |
|---|---|---|---|
| Composition (part(s) by weight) | | | |
| Anhydride-methyl methacrylate copolymer (Comparative Reference Example No) and its amount (in parentheses) | — | — | 1 (10) |
| NNDMA | — | — | 80 |
| MMA | — | — | 10 |
| V-65 | — | — | 0.2 |
| Average degree of polymerization of polymer composed of NNDMA and MMA (presumed value) | — | — | 1126 |
| Physical properties | | | |
| Water content (% by weight) | 38 | 78 | — |
| Tensile strength (kgf/cm$^2$) | 6.5 | 9.3 | — |
| Elongation percentage at breaking (%) | 140 | 90 | — |
| Visible ray permeability (%) | — | — | 65.5 |
| Elution test (difference between the amounts of consumed potassium permanganate solution) (ml) | — | — | — |
| Percentage of size change (%) | — | — | (Dissolved in ISO isotonic sodium chloride solution) |

From the results shown in Tables 2 to 3, it can be understood that all films obtained in Examples 1 to 18 have a high water content and are excellent in transparency. Also, it can be understood that these films have comparatively high tensile strength and difficulty in being broken because of a high elongation percentage at breaking. Therefore, it can be understood that these films have a high mechanical strength, and further only show an extremely small size change based on pH change of a solution, and these films are accepted in the elution test.

On the contrary, from the results shown in Table 5, it can be understood that, in particular, the film obtained in Comparative Example 2 is easily broken because of low elongation percentage at breaking. Therefore, it can be understood that the film has a low mechanical strength. Also, it can be understood that the film obtained in Comparative Example 3 is poor in transparency when it is hydrated with distilled water in addition to being dissolved in ISO isotonic sodium chloride solution. Accordingly, it can be understood that these films obtained in Comparative Examples 1 to 3 are not films having all excellent physical properties, on the contrary, the films obtained in Examples 1 to 18 have all excellent physical properties.

Also, from the results shown in Table 4, it can be understood that all plates obtained in Examples 19 to 26 have a high water content and are excellent in transparency. Also, it can be understood that these plates have comparatively high tensile strength and difficulty in being broken because of a high elongation percentage at breaking. Therefore, it can be understood that these plates have a high mechanical strength, and further only show an extremely small size change based on pH change of a solution and are accepted in the elution test. Furthermore, it can be understood that these plates have a high rubber hardness, so that these plates are excellent in shape stability when the thickness of a lens is small and the plates are easy of handling.

INDUSTRIAL APPLICABILITY

The ocular lens material of the present invention has an excellent optical property, a high water-absorptive property and a high mechanical strength, and further only shows an extremely small size change based on pH change of a solution and the like under the hydrated state and only has extremely small possibility of being eluted into water. Accordingly, the ocular lens material can be preferably used for high water-absorptive contact lenses and the like, and ocular lenses having desired shape can be produced on a large scale by applying conventional methods for molding and the like to the ocular lens material.

Also, according to the process for producing the ocular lens material of the present invention, there can be easily produced an ocular lens material as mentioned above, which has an excellent optical property, a high water-absorptive property and a high mechanical strength, and further only shows an extremely small size change based on pH change of a solution and the like under the hydrated state and only has extremely small possibility of being eluted into water.

I claim:

1. An ocular lens material containing a polymer having a maleimide derivative-α-methylstyrene unit represented by the formula (I):

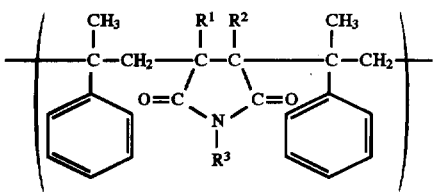

wherein each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms, and N,N-dimethylacrylamide unit represented by the formula (II):

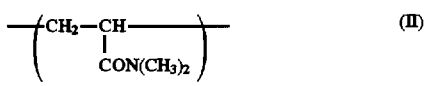

2. The ocular lens material of claim 1, wherein said N,N-dimethylacrylamide unit is a unit represented by the formula (III):

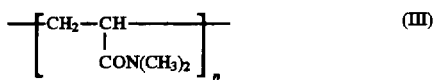

in which n is 100 to 100000 on the average.

3. The ocular lens material of claim 1, wherein said N,N-dimethylacrylamide unit is a unit crosslinked with a crosslinkable monomer.

4. The ocular lens material of claim 1, wherein said maleimide derivative-α-methylstyrene unit comprises 20 to 50% by mole of a maleimide derivative represented by the formula (IV):

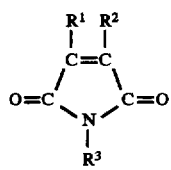

in which each of $R^1$ and $R^2$ is independently hydrogen atom or an alkyl group having 1 to 2 carbon atoms, and $R^3$ is hydrogen atom, an alkyl group having 1 to 12 carbon atoms or an aryl group which may be substituted, having 6 to 12 carbon atoms, and 50 to 80% by mole of α-methylstyrene.

5. The ocular lens material of claim 1, wherein said maleimide derivative-α-methylstyrene unit has a unit based on at least one member of hydrophobic monomers selected from the group consisting of a (meth)acrylic acid alkyl ester, styrene, an alkylstyrene, an itaconic acid alkyl ester, a crotonic acid alkyl ester, an aliphatic carboxylic acid vinyl ester, isopropenyl acetate and an anhydride.

6. The ocular lens material of claim 5, wherein said maleimide derivative-α-methylstyrene unit comprises 20 to 50% by mole of the maleimide derivative, 20 to 80% by mole of α-methylstyrene and 0 to 40% by mole of the hydrophobic monomer.

7. The ocular lens material of claim 1, wherein said N,N-dimethylacrylamide unit has a unit based on at least one member of other monomers selected from the group consisting of a (meth)acrylic acid alkyl ester, styrene, an alkylstyrene, an itaconic acid alkyl ester, a crotonic acid alkyl ester, an aliphatic carboxylic acid vinyl ester, isopropenyl acetate and a N-vinyllactam.

8. The ocular lens material of claim 7, wherein said N,N-dimethylacrylamide unit comprises 20 to 95% by weight of N,N-dimethylacrylamide and 5 to 80% by weight of the other monomers.

9. The ocular lens material of claim 1, wherein said polymer contains 5 to 40% by weight of the maleimide derivative-α-methylstyrene unit and 60 to 95% by weight of the N,N-dimethylacrylamide unit.

10. A process for producing the ocular lens material of claim 1, characterized by carrying out the polymerization with dissolving a maleimide derivative-α-methylstyrene copolymer obtained by polymerizing a copolymerizable component containing a maleimide derivative represented by the formula (IV):

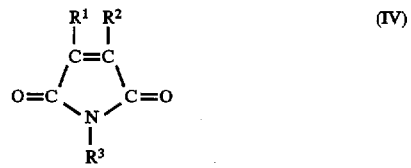

wherein each of $R^1$ and $R^2$ is independently hydrogen atom or an alkyl group having 1 to 2 carbon atoms, and $R^3$ is hydrogen atom, an alkyl gorup having 1 to 12 carbon atoms or an aryl group which may be substituted, having 6 to 12 carbon atoms and α-methylstyrene, in N,N-dimethylacrylamide, and then, heating the obtained polymer composition to 130° to 250° C.

11. The process of claim 10, wherein said copolymerizable component contains at least one member of hydrophobic monomers selected from the group consisting of a (meth)acrylic acid alkyl ester, styrene, an alkylstyrene, an itaconic acid alkyl ester, a crotonic acid alkyl ester, an aliphatic carboxylic acid vinyl ester, isopropenyl acetate and an anhydride.

12. The process of claim 10, wherein after said maleimide derivative-α-methylstyrene copolymer is dissolved in N,N-dimethylacrylamide, at least one member of other monomers selected from the group consisting of a (meth)acrylic acid alkyl ester, styrene, an alkylstyrene, an itaconic acid alkyl ester, a crotonic acid alkyl ester, an aliphatic carboxylic acid vinyl ester, isopropenyl acetate and a N-vinyllactam is added thereto, and then, the polymerization is carreid out.

* * * * *